US009420299B2

(12) United States Patent
Cordara et al.

(10) Patent No.: US 9,420,299 B2
(45) Date of Patent: Aug. 16, 2016

(54) METHOD FOR PROCESSING AN IMAGE

(71) Applicant: Huawei Technologies Co., Ltd., Shenzhen (CN)

(72) Inventors: Giovanni Cordara, Munich (DE); Imed Bouazizi, Munich (DE); Lukasz Kondrad, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/517,982

(22) Filed: Oct. 20, 2014

(65) Prior Publication Data

US 2015/0036939 A1 Feb. 5, 2015

Related U.S. Application Data

(63) Continuation of application No. PCT/EP2012/057300, filed on Apr. 20, 2012.

(51) Int. Cl.

| | |
|---|---|
| ***G06K 9/46*** | (2006.01) |
| ***H04N 19/20*** | (2014.01) |
| ***G06F 17/30*** | (2006.01) |
| ***G06T 9/00*** | (2006.01) |
| ***H04N 19/176*** | (2014.01) |

(Continued)

(52) U.S. Cl.

CPC .......... *H04N 19/20* (2014.11); *G06F 17/30247* (2013.01); *G06K 9/4604* (2013.01); *G06K 9/4642* (2013.01); *G06K 9/4671* (2013.01); *G06T 9/00* (2013.01); *H04N 19/129* (2014.11); *H04N 19/132* (2014.11); *H04N 19/136* (2014.11); *H04N 19/176* (2014.11); *H04N 19/467* (2014.11)

(58) Field of Classification Search

CPC ..... G06K 9/00; G06K 9/4642; H04N 19/176; H04N 19/119; H04N 19/91; H04N 19/14; G06T 9/00; G06T 9/20

See application file for complete search history.

(56) References Cited

U.S. PATENT DOCUMENTS

| | | | | |
|---|---|---|---|---|
| 5,289,289 A * | 2/1994 | Nagasaki | G06F 17/147 | 375/240.14 |
| 8,639,034 B2 * | 1/2014 | Liu | G06K 9/00979 | 382/190 |

(Continued)

FOREIGN PATENT DOCUMENTS

| | | |
|---|---|---|
| JP | 2006222982 A | 8/2006 |
| JP | 2008172810 A | 7/2008 |

(Continued)

OTHER PUBLICATIONS

Duan, Ling-Yu, et al. "Overview of the MPEG-CDVS Standard." Image Processing, IEEE Transactions on 25.1 (2016): 179-194.*

(Continued)

*Primary Examiner* — Stephen R Koziol
*Assistant Examiner* — Jonathan S Lee
(74) *Attorney, Agent, or Firm* — Conley Rose, P.C.; Grant Rodolph; Adam J. Stegge

(57) ABSTRACT

The disclosure relates to a method for processing an image, the method comprising: providing a set of key points from the image; describing location information of the set of key points in form of a binary matrix; and scanning the binary matrix according to a pre-determined order, thereby creating a new representation of the location information of the set of key points.

14 Claims, 16 Drawing Sheets

401

402

(51) Int. Cl.

| | |
|---|---|
| ***H04N 19/129*** | (2014.01) |
| ***H04N 19/132*** | (2014.01) |
| ***H04N 19/136*** | (2014.01) |
| ***H04N 19/467*** | (2014.01) |

(56) References Cited

U.S. PATENT DOCUMENTS

| | | | | |
|---|---|---|---|---|
| 8,805,067 | B2 * | 8/2014 | Lee | G06K 9/6202 382/100 |
| 8,866,924 | B2 * | 10/2014 | Tang | G06K 9/4671 348/222.1 |
| 9,258,564 | B2 * | 2/2016 | Pau | G06K 9/6218 |
| 2009/0304292 | A1 * | 12/2009 | Chen et al. | 382/233 |
| 2010/0226575 | A1 | 9/2010 | Grzeszczuk et al. | |
| 2013/0039566 | A1 * | 2/2013 | Reznick et al. | 382/154 |

FOREIGN PATENT DOCUMENTS

| | | | |
|---|---|---|---|
| KR | 20110091763 | A | 8/2011 |
| WO | 03047263 | A1 | 6/2003 |

OTHER PUBLICATIONS

Foreign Communication From A Counterpart Application, PCT Application No. PCT/EP2012/057300, International Search Report dated Feb. 4, 2013, 4 pages.

Foreign Communication From A Counterpart Application, PCT Application No. PCT/EP2012/057300, Written Opinion dated Feb. 4, 2013, 5 pages.

Tsai, S., et al., "Location Coding for Mobile Image Retrieval," International Mobile Multimedia Communications Conference, Sep. 2009, 7 pages.

Blaszak, L., et al., "Spiral Coding Order of Macroblocks with Applications to SNR-Scalable Video Compression," IEEE International Conference on Image Processing, Sep. 11-14, 2005, 4 pages.

Lowe, D., et al., "Distinctive Image Features from Scale-Invariant Keypoints," Jan. 5, 2004, 1 page.

Beek, P., et al., "Text of 15938-5 FCD Information Technology—Multimedia Content Description Interface—Part 5 Multimedia Description Schemes," ISO/IEC JTC 1/SC29/WG 11/N3966, Mar. 2001, 798 pages.

Tsai, S., et al., "Improvements to the location coder in the TMUC," ISO/IEC JTC1/SC29/WG11, MPEG2011/M23579, Feb. 2012, 8 pages.

"Description of Test Model under Consideration for CDVS," ISO/IEC JTC1/SC29/WG11/N12367, Dec. 2011, 24 pages.

Francini, G., et al., "Telecom Italia's Response to the MPEG CfP for Compact Descriptors for Visual Search," ISO/IEC JTC1/SC29/WG11, MPEG 2011/M22672, Nov. 2011, 10 pages.

Bay, H., et al., "SURF: Speeded Up Robust Features," Computer Vision ECCV, Lecture Notes in Computer Science, 2006, 14 pages.

"Information Technology—Multimedia Content Description Interface—Part 13: Compact Descriptors for Visual Search," ISO/IEC JTC1/SC 29, ISO/IEC FCD 15938-13, Apr. 4, 2014, 139 pages.

Foreign Communication From A Counterpart Application, Korean Application No. 10-2014-7027804, Brief Translation of Korean Notice of Allowance dated Feb. 26, 2016, 3 pages.

Partial English Translation and Abstract of Japanese Patent Application No. JP2006222982, Jan. 29, 2016, 31 pages.

Partial English Translation and Abstract of Japanese Patent Application No. JP2008172810, Jan. 29, 2016, 77 pages.

Foreign Communication From A Counterpart Application, Japanese Application No. 2015-504871, Japanese Office Action dated Dec. 1, 2015, 10 pages.

Foreign Communication From A Counterpart Application, Japanese Application No. 2015-504871, English Translation of Japanese Office Action dated Dec. 1, 2015, 11 pages.

Belongie, S., et al., "Shape Matching and Object Recognition Using Shape Contexts," IEEE Transactions on Pattern Analysis and Machine Intelligence, vol. 24, No. 24, Apr. 2002, pp. 509-522.

Moraleda, J., et al., "Towards Massive Scalability in Image Matching," International Conference on Pattern Recognition, Aug. 23-26, 2010, pp. 3424-3427.

Chandrasekhar, V., et al., "Low Latency Image Retrieval with Progressive Transmission of CHoG Descriptors," Proceedings of the ACM multimedia workshop on Mobile Cloud Media Computing, 2010, pp. 41-46.

Foreign Communication From A Counterpart Application, European Application No. 12719617.8, European Office Action dated Aug. 11, 2015, 5 pages.

* cited by examiner

500

METHOD FOR PROCESSING AN IMAGE

CROSS-REFERENCE TO RELATED APPLICATION

This application is a continuation of International Application No. PCT/EP2012/057300, filed on Apr. 20, 2012, which is hereby incorporated by reference in its entirety.

TECHNICAL FIELD

The present disclosure relates to image processing techniques in the field of computer vision and, in particular, to the topic normally referred to as Visual Search or Augmented Reality. In Visual Search and Augmented Reality applications, information extracted from an image or a sequence of images is sent to a server where it is compared against information extracted from a database of reference images, or sequences of images, representing models of objects to be recognized. In this context, the present disclosure relates to the compression of the information extracted from the image or the sequence of the images, which is sent to the server. In particular, the disclosure relates to the compression of the position of the points of interest extracted from the image or the sequence of the images.

BACKGROUND

Visual Search (VS) is referred to as the capability of an automated system to identify an object or objects depicted in an image or in a sequence of images by only analyzing the visual aspects of the image or the sequence of images without exploiting any external data such as textual description, metadata, etc. Augmented Reality (AR) can be considered an advanced usage of VS and applied to the mobile domain. After the objects depicted in a sequence of images have been identified, additional content such as normally synthetic objects are superimposed to the real scene thereby 'augmenting' the real content with a position consistent to the real objects. The enabling technology for identifying objects depicted in the sequence of images is the same. In the following, the terms image and picture are synonymously used.

Currently, the predominant method of visual search relies on determining so called local features, which are also referred to as features or descriptors. Common methods are Scale-Invariant Feature Transforms (SIFT) as described in "D. Lowe, Distinctive Image Features from Scale-Invariant Keypoints, Int. Journal of Computer Vision 60 (2) (2004) 91-110. H." and Speeded Up Robust Features (SURF) and in "Bay, T. Tuytelaars, L. V. Gool, SURF: Speeded Up Robust Features, in: Proceedings of European Conference on Computer Vision (ECCV), Graz, Austria, 2006, http://www.vision.ee.ethz.ch/~surf/". In literature it is possible to find many variations of those technologies that can be considered improvements of those two original technologies.

As can be seen from FIG. 13, a local feature is a compact description, e.g., 128 Bytes for each feature in SIFT of a patch 1303 surrounding a point 1305 in an image 1301. FIG. 13 shows an example of extraction (upper part of FIG. 13) and representation (lower part of FIG. 13) of local features. In the upper part of FIG. 13, the position of the points where the local feature is computed is indicated by a circle representing the point 1305 in the image 1301 The circle is surrounded by a square representing the oriented patch 1303. In the lower part of FIG. 13, a grid 1309 subdivision of the patch 1303 contains histogram components 1311 of the local feature. In order to compute a local feature, a main orientation 1307 of the point 1305 is computed based on the main gradient component in the point's 1305 surrounding. Starting from this orientation 1307, a patch 1303 oriented towards the main orientation 1307 is extracted. This patch 1303 is then subdivided into a rectangular or radial grid 1309. For each element of the grid 1309, a histogram 1311 of the local gradients is computed. The histograms 1311 computed for the grid 1309 elements represent the components of the local feature. Characteristic of such descriptor 1313 containing the histograms 1311 of the grid 1309 elements as illustrated in the lower part of FIG. 13 is to be invariant to rotation, illumination, and perspective distortions.

In an image 1301, the points 1305 upon which descriptors 1313 are computed normally relate to peculiar elements of the scene, e.g., corners, specific patterns, etc. Such points are normally called key points 1305, which are the circles depicted in the upper part of FIG. 13. The process of computation of the key points 1305 is based on the identification of local extrema in a multi-scale image 1301 representation.

When two images 1301, 1401 are compared as shown in FIG. 14, each descriptor 1313 of the first image 1301 is compared against each descriptor of the second image 1401. FIG. 14 illustrates only the images 1301, 1401 and not the descriptors. Adopting a distance measure, matchings are identified between different key points, e.g., between a first key point 1305 in the first image 1301 and a second key point 1405 in the second image 1401. The correct matchings, normally called inliers 1407, need to have consistent relative positions despite possible scaling, rotation, and perspective distortions in the images 1301, 1401. Errors in the matching phase, which might happen due to the statistical approach adopted for key point extraction, are then eliminated through a phase called geometric consistency check where the consistency of the position of different key points is estimated. The errors, normally called outliers 1409, are removed as illustrated by the dashed lines in FIG. 14.

According to the number of remaining inliers 1407, estimation about the presence of the same object in the two images 1301, 1401 can be performed.

In a VS pipeline system 1500 representing typical client-server service architecture, as illustrated in FIG. 15, descriptors are computed on a client device 1501 by a procedure of key point identification 1505, features computation 1507, features selection 1509 as described below, and encoding 1511. The descriptors are sent to a server 1503 that matches 1513 those descriptors 1519 against the descriptors, i.e., reference descriptors 1521 extracted from the reference images on the database. In detail, the data stream 1515 from the client 1501 is decoded 1517 to obtain the descriptors 1519 of the original image that are matched 1513 against the reference descriptors 1521 computed by key point identification 1523 and features computation 1525 from the reference images on the database. After the matching 1513 a geometric consistency check 1527 is applied for checking the geometric consistency of the reconstructed image.

Thousands of features can be extracted from an image. This may result in a considerable amount of information, e.g., several Kilobytes per image, being sent over the network. In some scenarios, the bit-rate required for sending the descriptors can be larger than the compressed image itself.

This represents a problem for real-time applications due to possible network delays in the client/server link and the amount of memory required on the server side where descriptors of millions of reference images are kept in memory at the same time. Therefore, the need for compressed versions of the descriptors is rising. Two steps are needed to enable descriptor compression starting from uncompressed descriptors. The first step is a mechanism of key point selection as follows: not all the descriptors extracted from the image are sent to the server, but only those that, according to a statistical analysis, are less error-prone during the matching phase and refer to points considered more distinctive for the depicted object. The second step is a compression algorithm applied to the remaining descriptors.

Moving Pictures Experts Group (MPEG) standardization is currently defining a new part of the standard MPEG-7 (ISO/IEC 15938—Multimedia content description interface), part 13, dedicated to the development of a standardized format of compressed descriptors. In order to test the compression capabilities of the emerging standard, six operating points, representing the bit rate necessary to store or send all the descriptors extracted from an image, have been identified as 512-1024-2048-4096-8192-16384 Bytes. The testing phase is conducted using those operating points as reference. Due to the application of the key point selection mechanism, a different number of key points will be transmitted to the server at those operating points. This number may span between 114 key points at the lowest operating point to 970 key points at the highest operating point.

When descriptor compression is applied to descriptors, two different kinds of information are compressed. The first one relates the values of the descriptor. The second one is the location information of the descriptors, i.e., the x/y position, which represents the Cartesian coordinates of the key points in the image.

In the current Reference Model (RM) of the VS standard, as well as in the vast majority of the VS algorithms existing in literature, before the descriptor extraction phase, the image is scaled to Video Graphics Array (VGA) resolution, which is 640×480 pixels. VGA resolution is hereinafter referred to as full resolution.

Therefore, a native x/y couple describing the position of a single key point in the image can occupy 19 bits. This is unacceptable, in particular at the lowest operating points. Therefore, compression of location information is needed in order to allocate more bits for inserting more descriptors or applying less restrictive compression algorithms to the descriptors.

The key points coordinates are represented in floating points values in the original non-scaled image resolution. Since the first operation applied to every image is the downscale to VGA resolution, the key points coordinates are rounded to integer values in VGA resolution, which is 19 bits natively. Therefore, it might happen that several points are rounded to the same coordinates. It is also possible to have two descriptors computed exactly on the same key point with two different orientations. This first rounding has negligible impact on the retrieval performances.

FIG. 16 depicts an example of such a rounding operation where each square cell 1603, 1605 corresponds to a 1×1 pixel cell at full resolution. An image 1600 can be created where non-null pixels correspond to the position of the key points. The image 1600 is then partitioned into a pixel cell representation 1601, which can be represented by a matrix representation 1602. Values of these square cells 1603, 1605, e.g., 2 for the first square cell 1603 and 1 for the second square cell 1605 as depicted in FIG. 16, are represented in a matrix 1602 where non-null cells 1607, 1609 represent key points' position, e.g., a first non-null cell 1607 corresponding to the first square cell 1603 and a second non-null cell 1609 corresponding to the second square cell 1605. Consequently, the problem can be reformulated as the need to compress a matrix 1602 of 640×480 elements, with the characteristic of being extremely sparse, i.e., less than 1000 non-null cells, even at the highest operating point. For compressing this matrix, there is the need to represent two different kinds of information: a Histogram map, which is a binary map of empty and non-empty cells and a Histogram count, and a vector containing the number of occurrences in each non-null cell. The Histogram map is represented by the binary format of the pixel cell representation 1601 depicted in FIG. 16 and the Histogram count is represented by the vector created by the non-null elements of matrix representation 1602 depicted in FIG. 16. For improving compression efficiency, these two elements are always encoded separately in the existing literature.

In the existing literature, a lossy technique encompassing block quantization is applied to the histogram map to improve compression efficiency. Normally, 4×4 blocks or 8×8 blocks are adopted, which leaves the mechanism for histogram map and histogram count generation unchanged. As a result of this operation, the dimension of the matrix substantially decreases, i.e., down to 140×120 pixels when 4×4 blocks are applied and 70×60 pixels when 8×8 blocks are applied. Nevertheless, the downscale matrix still remains a very sparse matrix. In this case, the representation of FIG. 16 is still valid. Only cell dimension is changing. In the rest of the disclosure, elements of the histogram map matrix are referred as matrix cells. This dimension of these matrix cells may range from 1×1 at full resolution to N×N with N>1 (e.g., 8×8) in the compressed cases.

In the existing literature, three main documents present the latest progresses in the field of location information compression. The first one is the MPEG Reference Model "G. Francini, S. Lepsoy, M. Balestri "Description of Test Model under Consideration for CDVS", ISO/IEC JTC1/SC29/WG11/N12367, Geneva, November 2011," which is referred to herein as [RM].

The second one is the MPEG input contribution, "S. Tsai, D. Chen, V. Chandrasekhar, G. Takacs, M. Makar, R. Grzeszczuk, B. Girod, "Improvements to the location coder in the TMuC ", ISO/IEC JTC1/SC29/WG11/M23579672, San Jose, February 2012," which is referred to herein as [Stanford1]. The third one is the conference paper "S. Tsai, D. Chen, G. Takacs, V. Chandrasekhar, J. Singh, and B. Girod, "Location coding for mobile image retrieval", International Mobile Multimedia Communications Conference (MobiMedia), September 2009," which is referred to herein as [Stanford2].

Even though they take different approaches, all of these three papers have the same problem: the coordinates are not represented in full resolution. Rather, the coordinates are in the quantized domain, i.e., at 4×4, 6×6, 8×8 blocks.

The application of block quantization to the histogram map, despite the lossy compression, is able to guarantee limited performance drop in terms of retrieval accuracy. Anyway, when localization of the recognized object in the query image is necessary, e.g., in augmented reality applications, where the object needs to be localized and tracked across a sequence of pictures, applying these quantized blocks causes a significant drop of performances. For example, according to [Stanford1] the localization precision decreases about five percent (5%) when 4×4 blocks are applied at the lowest operating point, and 10% when blocks have 8×8 dimension.

When scaling up to full resolution, the prior art presents some problems. Histogram count compression is quite straightforward; it will not therefore be taken into consideration. The problems that arise for the compression of the histogram map matrix are presented in the following.

The [RM] paper adopts a method aimed at decreasing the sparsity of the matrix by eliminating null rows and columns from the histogram map where no key points appear. One bit is spent for each row and column to indicate whether the full row, or column, is empty. The problem at full resolution is that, with a 480×640 matrix, there is the need of 1120 bits for embedding this information into a compressed bit stream. This is an unacceptable amount of bits resulting in almost 10 bits per key points at the lowest operating point (114 points).

In [Stanford1], a binary entropy coding is adopted over the whole matrix with the following two improvements. Macro-block analysis is applied, i.e., the matrix is subdivided into macro-blocks, referred herein after as skip-Macroblocks, and for each macro-block one bit indicating whether the block is empty is allocated. If the block is fully empty, its elements don't undergo the entropy coding process. Also, a context modeling is applied to the entropy coding and it is based on the cells surrounding the one to be encoded. In particular 10 neighbors are considered, with a resulting number of 45 contexts. In addition to its complexity, in particular for the training phase with 45 context to be generated, this approach cannot effectively be applied to the full resolution case where the matrix is so sparse that it is very rare to encounter non-null cells among the 10 most proximity cells.

According to the [Stanford 2] paper, two methods are applied. A first one is very similar to that presented in the [Stanford 1] paper and presents the same problems. Therefore, it will not be further discussed here. A second one is based on quad-trees. Quad-trees provide a quite effective representation when the matrix is dense, but when the matrix is very sparse, as in the full resolution case, the construction of the tree can be too bit-consuming, resulting in degraded performances.

SUMMARY

It is the object of the disclosure to provide a concept for image processing that shows improved compression rates of the location information compared to the prior art concepts as presented above and very low complexity.

This object is achieved by the features of the independent claims. Further implementation forms are apparent from the dependent claims, the description and the figures.

The task of compression of histogram maps of an image can be considered as a compression of a very sparse matrix. The disclosure is based on the finding that despite this sparsity, key points are not uniformly distributed across the image, in particular at lower bitrates. This is in particular due to the key points selection mechanism, applied to identify a subset of key points from all the extracted key points. Because typically the objects of interests tend to be depicted in the center of an image, the key point selection mechanism also privileges short distances from the image center. When alternative key point selection methods are applied, for example based on Region of interests (ROI), the distribution of the key point in the image is still not uniform. As a consequence, there are areas more densely populated, normally located around the center of the image, whereas the sides of the matrix will have a predominant number of zeros. Therefore, it is possible to envisage an adaptive usage of the skip-Macroblocks information utilized in the [Stanford1] approach that conversely applies the block representation uniformly across the image to exploit this feature. In the center of the matrix empty areas occur very rarely. Therefore, the adoption of very large macro-blocks is envisaged using a few bits for the skip-Macroblock information signaling. On the other hand, at the sides of the matrix it is beneficial to apply smaller macro-blocks to identify with more precision the empty areas.

Aspects of the disclosure provide a concept for image processing which improves the performances of location information compression algorithms.

In order to describe the disclosure in detail, the following terms, abbreviations and notations will be used:

VS: Visual Search. VS is referred to as the capability of an automated system to identify an object or objects depicted in a picture or in a sequence of pictures by only analyzing the visual aspects of the picture or the sequence of pictures, without exploiting any external data, such as textual description, metadata, etc.

AR: Augmented Reality. AR can be considered as an advanced usage of VS, in particular applied to the mobile domain. After the objects depicted in a sequence of frames have been identified, additional content, normally synthetic objects is superimposed to the real scene, thus 'augmenting' the real content, with a position consistent to the real objects.

SIFT: Scale-Invariant Feature Transforms.

SURF: Speeded Up Robust Features.

MPEG-7: Moving Pictures Expert Group No. 7, defines the multimedia content description interface, part 13 according to ISO/IEC 15938, dedicated to the development of a standard for Visual Search.

ROI: Region of interest.

RM: Reference Model.

VGA: Video Graphics Array, also referred to as full resolution.

Local feature: A local feature is a compact description of a patch surrounding a key point in an image, invariant to rotation, illumination, and perspective distortions.

Descriptor: A local feature.

Key point: In an image, the points upon which descriptors are computed normally relate to peculiar elements of the scene, e.g. corners, specific patterns, etc. Such points are normally called key points. The process of computation of the key points is based on the identification of local extrema in a multi-scale image representation.

Skip-Macroblock: A segment of a matrix representing the histogram map of an image that doesn't contain non-null values.

According to a first aspect, the disclosure relates to a method for processing an image, the method comprising: providing a set of key points from the image, describing location information of the set of key points in form of a binary matrix, and scanning the binary matrix according to a pre-determined order, thereby creating a new representation of the location information of the set of key points.

By the first aspect of the disclosure, a new method for processing of the location information of descriptors (local features) extracted from an image, in particular to be used for the compression of a histogram map matrix, is presented. The method provides an improved compression rate when compared to the state of the art technology. The method can be applied without encountering any native problem at full resolution level. The disclosure offers a new representation of the data, which enables a more efficient block-based analysis and representation. An adaptive block-based analysis can be applied on top of this new representation, better exploiting the nature of the data to achieve improved compression rate. The complexity of the presented method is extremely limited, because no complex operations are encompassed.

In a first possible implementation form of the method according to the first aspect, the scanning of the binary matrix according to the pre-determined order includes scanning the binary matrix beginning with key points located at or around a region of interest of the image towards key points located at a periphery of the image or vice versa.

A region of interest of an image is typically located in the central areas of the image. Therefore, processing can be improved when scanning differentiates between key points located at or around the region of interest and the not interesting region at the periphery of the image.

In a second possible implementation form of the method according to the first implementation form of the first aspect, the region of interest of the image lies at or around the center of the image.

Usually the most relevant information of an image can be extracted from the center or from around the center of the image. Processing and thereby compression can be improved if the processing discriminates between center and periphery of the image.

In a third possible implementation form of the method according to the first aspect as such or according to any of the preceding implementation forms of the first aspect, the scanning the binary matrix is performed counter-clockwise or clockwise.

By a counter-clockwise or a clockwise scanning, processing can be improved.

In a fourth possible implementation form of the method according to the first aspect as such or according to the first implementation form of the first aspect, the scanning the binary matrix runs in sections of concentric circular rings of the image.

As most essential features are located in the center of the image, small rings towards the center of the image carry the most information while large rings towards the periphery of the image carry the less information. Large rings towards the periphery are sparsely occupied and thus empty areas occur, that can be identified by the skip-Macroblock information.

In a fifth possible implementation form of the method according to the first aspect as such or according to any of the preceding implementation forms of the first aspect, the new representation of the location information of the set of key points takes the form of another binary matrix.

In a sixth possible implementation form of the method according to the fifth implementation form of the first aspect, the another binary matrix is created column-wise or row-wise.

Thus, areas carrying the essential information are located in neighboring areas in the new matrix representation, thus enabling the adoption of the following adaptive block analysis.

In a seventh possible implementation form of the method according to the fifth implementation form of the first aspect or according to the sixth implementation form of the first aspect, for each key point of the set of key points a descriptor is computed from an oriented patch surrounding the key point.

Descriptors usually relate to peculiar elements of the image, e.g., corners, specific patterns, etc. Therefore, relying on descriptors for image processing improves the performance for object recognition and tracking.

In an eighth possible implementation form of the method according to any of the fifth to the seventh implementation forms of the first aspect, the binary matrix is a histogram map of empty and non-empty cells. A non-empty cell represents a position of a key point in the image.

In a ninth possible implementation form of the method according to any of the fifth to the eighth implementation forms of the first aspect, the method further includes compressing the new representation of the location information of the set of key points.

When the new representation of the location information of the set of key points is generated by the method according to the first aspect or according to any of the preceding implementation forms of the first aspect, compression is improved as most of the relevant information, i.e., the non-null elements are concentrated in one region of the matrix. The another binary matrix comprises parts of high location information density and parts of low location information density. Thus, different compression techniques can be used for these parts improving compression.

In a tenth possible implementation form of the method according to the ninth implementation form of the first aspect, wherein the compressing the new representation of the location information of the set of key points includes shrinking a size of the binary matrix by eliminating peripheral sections of the binary matrix carrying no location information. The shrinking is performed before scanning the binary matrix.

Thus, non-essential information can be removed before performing the scanning thus reducing the amount of information to be compressed and improving the performance of the image processing method in terms of speed and storage.

In an eleventh possible implementation form of the method according to the ninth implementation form of the first aspect, the compressing the new representation of the location information of the set of key points includes eliminating empty elements of the another binary matrix corresponding to concentric rings of the binary matrix carrying no location information.

Thus, non-essential information can be removed after performing the scanning thus reducing the amount of information to be compressed and improving the performance of the image compression method in terms of speed and storage.

In a twelfth possible implementation form of the method according to any of the fifth to the eleventh implementation forms of the first aspect, the another binary matrix is partitioned into macro-blocks of different size. The macro-blocks carrying location information of key points located at or around a region of interest of the image have a larger size than macro-blocks carrying location information of key points located at a periphery of the image.

Thus, information from the center of the image is stored in large-sized macro-blocks while information from the periphery of the image is stored in small-sized macro-blocks. Therefore, some small-sized macro-blocks can be identified carrying only empty elements which can be removed from further processing, thereby improving the performance of the image processing.

In a thirteenth possible implementation form of the method according to the twelfth implementation form of the first aspect, entropy coding is applied to skip-Macroblocks information of the another binary matrix and to non-empty macro-blocks of the another binary matrix.

In a fourteenth possible implementation form of the method according to the thirteenth implementation form of the first aspect, context modelling is applied when the entropy coding is applied.

In a fifteenth possible implementation form of the method according to any of the twelfth to the fourteenth implementation forms of the first aspect, the another binary matrix comprises a first number of macro-blocks of certain size (MB_Size) dimension carrying location information located at and around the center of the image and a second number of macro-blocks of a fraction of MB_Size carrying location information located at the periphery of the image.

Using macro-blocks of MB_Size size dimension and a fraction thereof makes the method simple to be performed. No complicated memory allocation of different memory sizes has to be applied. The memory structure is extremely simple.

In a sixteenth possible implementation form of the method according to the fifteenth implementation form of the first aspect, a first number of macro-blocks of MB_Size size dimension is fixed across all images or depends on the size of the another matrix representation.

In a seventeenth possible implementation form of the method according to any of the fifth to the sixteenth implementation forms of the first aspect, the method further includes using a skip-Macroblock bit sequence to indicate empty macro-blocks of the another binary matrix carrying no location information.

By indicating empty macro-blocks of the another binary matrix carrying no location information, the method can leave those macro-blocks unconsidered for further compression steps, thereby increasing compression rate.

In an eighteenth possible implementation form of the method according to the seventeenth implementation form of the first aspect, the new representation of the location information of the set of key points is compressed by combining the entropy-coded skip-Macroblock bit sequence and the entropy-coded location information of non-empty macro-blocks of the another binary matrix.

In a ninteenth possible implementation form of the method according to the eighteenth implementation form of the first aspect, the location information is entropy-coded by using a context model exploiting the average number of non-empty elements in the non-empty macro-blocks computed over a training set.

This context doesn't require extra information to be signaled, and allows the entropy coder to be optimized according to the average density of macro-blocks in the another binary matrix.

In a twentieth possible implementation form of the method according to any of the fifth to the nineteenth implementation forms of the first aspect, to minimize memory occupancy, instead of the whole another binary matrix, only non-null elements of the another binary matrix or an ordered list of non-empty macro-blocks is memorized.

The most resource consuming operation is the context modeling, which is optional. Nevertheless, when context modeling is applied, a new context modeling method is proposed, which is simpler than the one adopted in the prior art. The presented context modeling method relies on a very limited number of contexts. Furthermore, no extra bits are used for the context modeling, since macro-block information is intrinsically conveyed in the new data representation.

According to a second aspect, the disclosure relates to a method for reconstructing local features of an image from a matrix representation of location information of a set of key points of the image including unpacking the matrix representation of location information of the set of key points of the image according to a pre-determined order, wherein the local features of the image are computed from oriented patches surrounding the key points.

The decompression method performs the reverse operations of the compression method in opposite order and thus shows the same advantages as the compression method described above.

According to a third aspect, the disclosure relates to a location information encoder, comprising a processor configured for providing a set of key points from the image; describing location information of the set of key points in form of a binary matrix, and scanning the binary matrix according to a pre-determined order, thereby creating a new representation of the location information of the set of key points.

The location information encoder thus has an extremely limited complexity as it implements the low-complexity location information compression method described above.

According to a fourth aspect, the disclosure relates to a location information decoder including a processor configured for reconstructing local features of an image from a matrix representation of location information of a set of key points of the image by unpacking the matrix representation of location information of the set of key points of the image according to a pre-determined order, wherein the local features of the image are computed from oriented patches surrounding the key points.

The location information decoder thus has an extremely limited complexity as it implements the low complexity image processing method described above.

According to a fifth aspect, the disclosure relates to a computer program with a program code for performing the method according to the first aspect as such or according to any of the preceding implementation forms of the first aspect or the method according to the second aspect when the program code is executed on a computer.

The methods described herein may be implemented as software in a Digital Signal Processor (DSP), in a microcontroller or in any other side-processor or as hardware circuit within an application specific integrated circuit (ASIC).

The disclosure can be implemented in digital electronic circuitry, or in computer hardware, firmware, software, or in combinations thereof.

BRIEF DESCRIPTION OF THE DRAWINGS

Further embodiments of the disclosure will be described with respect to the following figures, in which.

DETAILED DESCRIPTION OF EMBODIMENTS

Figure 1:
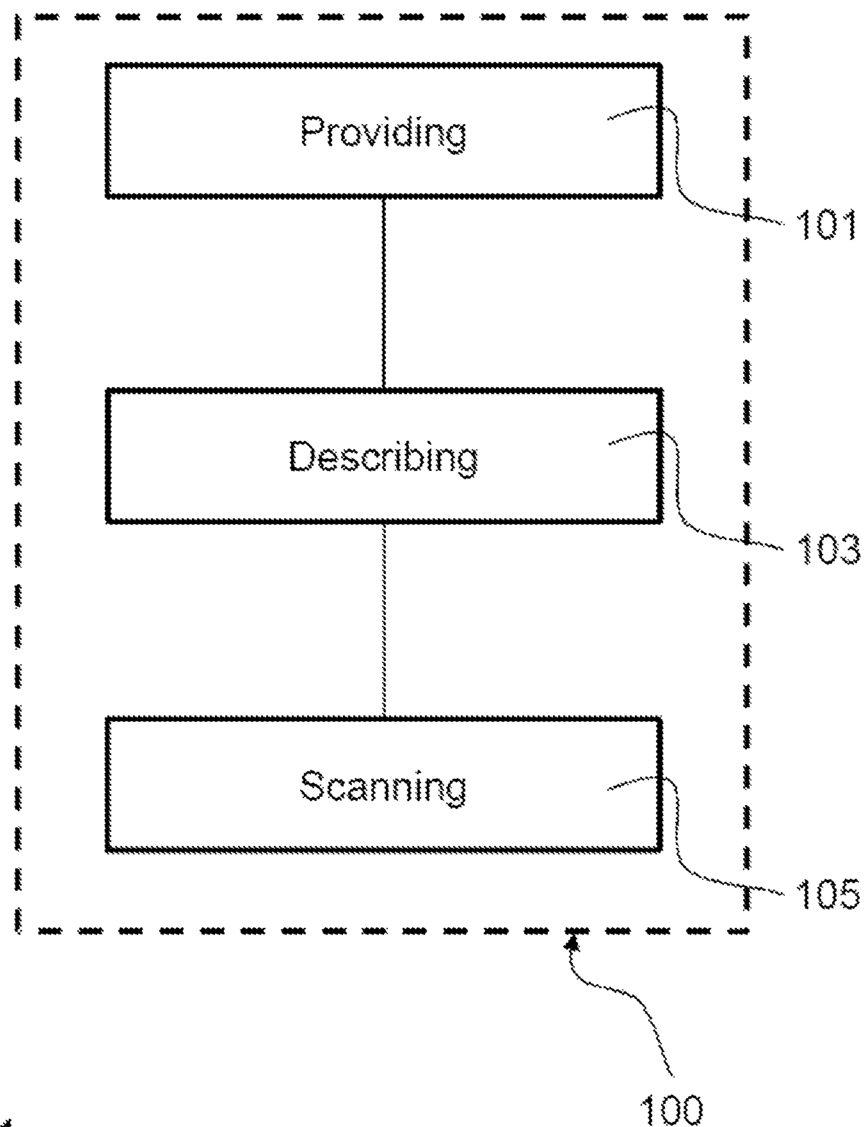
FIG. 1 shows a schematic diagram of an image processing method according to an implementation form.

FIG. 1 shows a schematic diagram of an image processing method 100 according to an implementation form. The image processing method 100 includes providing 101 a set of key points from the image, describing 103 location information of the set of key points in form of a binary matrix, and scanning 105 the binary matrix according to a pre-determined order, thereby creating a new representation of the location information of the set of key points. In an implementation form, the new representation of the location information of the set of key points is in the form of another binary matrix.

Figure 2:
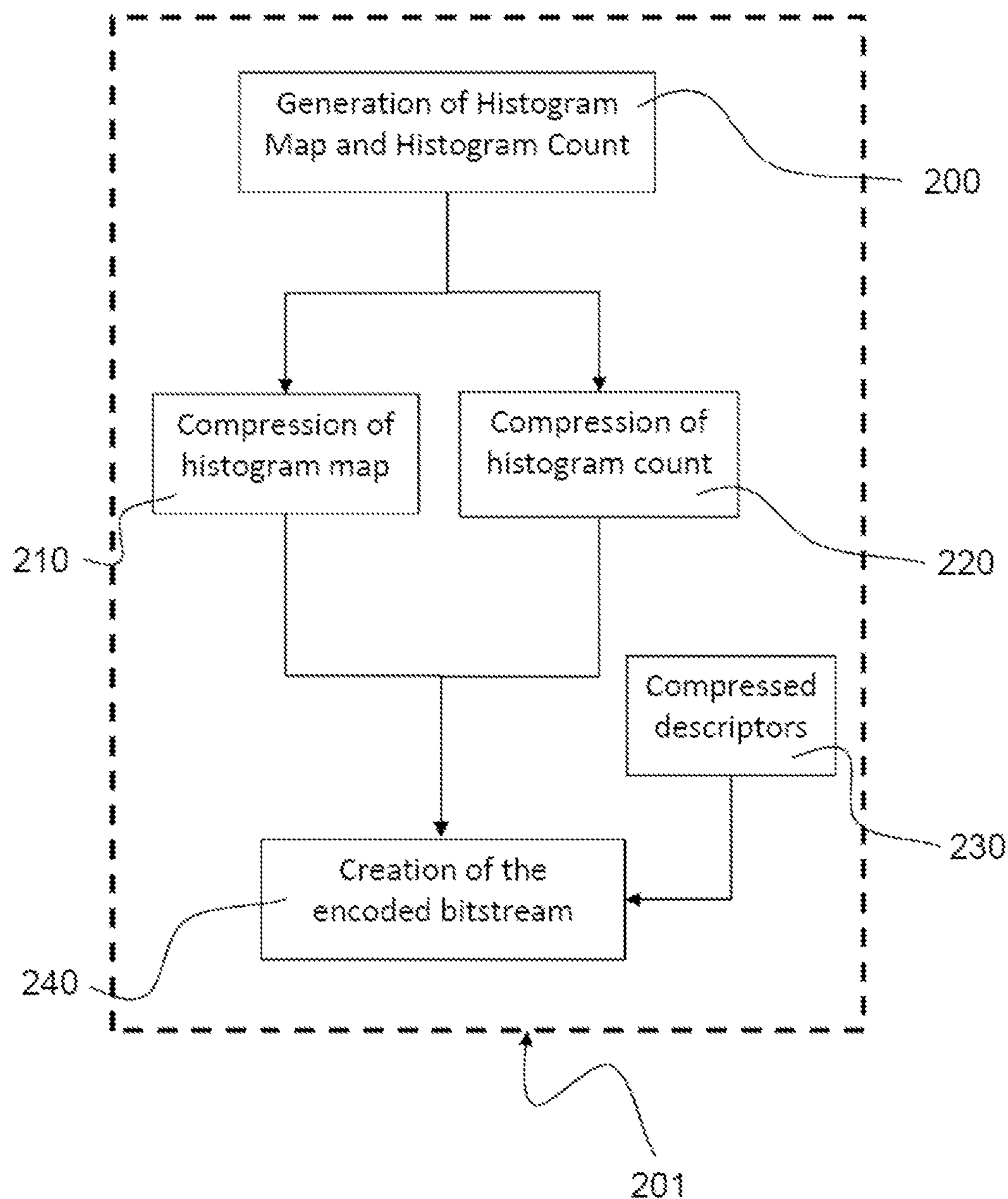
FIG. 2 shows a schematic diagram of a location information compression method according to an implementation form.
Figure 16:
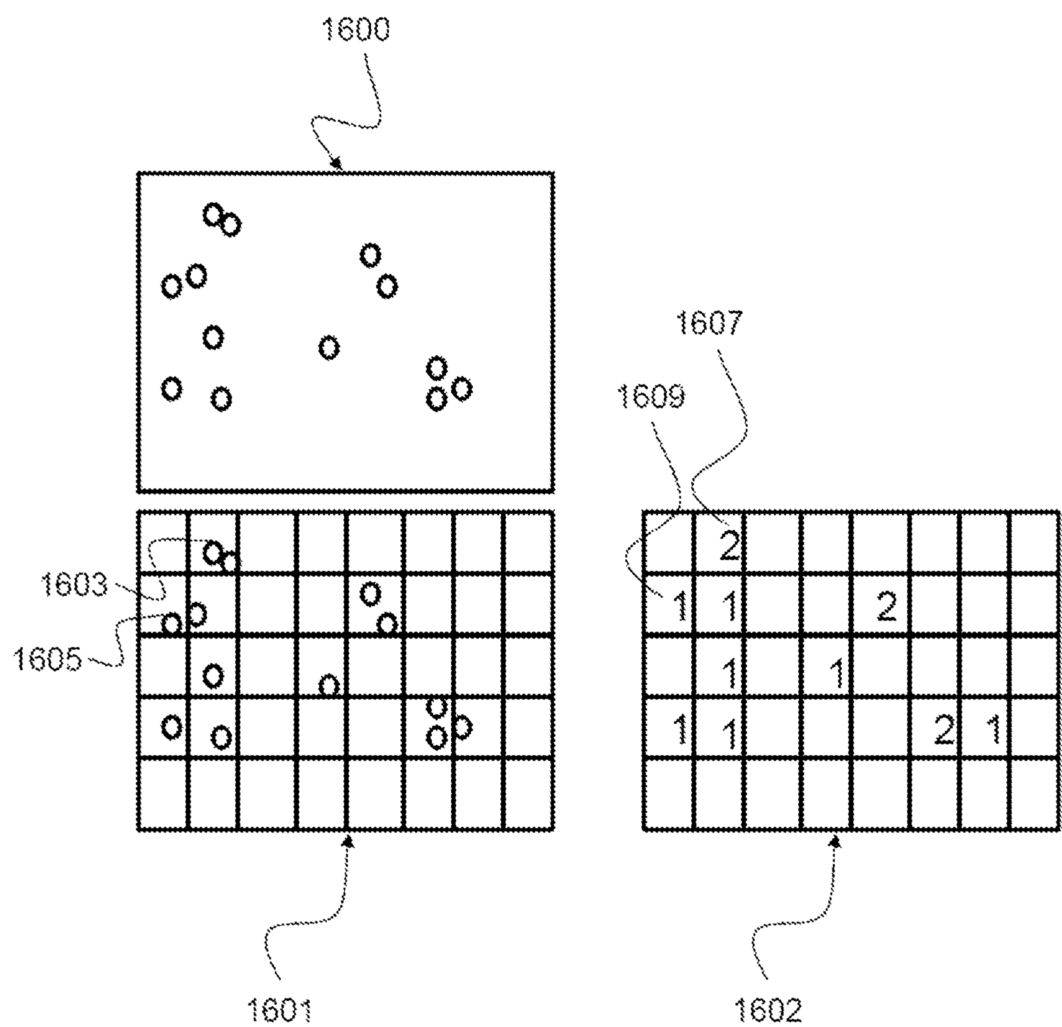
FIG. 16 shows a schematic diagram of a conventional histogram map and histogram count generation method.

FIG. 2 shows a schematic diagram of a location information compression method 201 according to an implementation form. The image compression method 201 includes a generation 200 of histogram map and histogram count, compression 210 of histogram map, compression 220 of histogram count, and creation 240 of the encoded bitstream depending on the compressed descriptors 230. The histogram map is the binary map of empty and non-empty cells of the image 1600 in pixel cell representation 1601 according to the illustration depicted in FIG. 16. An image 1600 can be partitioned into a pixel cell representation 1601, which can be represented by a matrix representation 1602. The histogram count is the number of occurrences in each non-null cell of the image 1600 in matrix representation 1602 according to the illustration depicted in FIG. 16. In an implementation form, compression 210 of histogram map and compression 220 of histogram count are performed in parallel. In an implementation form, compression 210 of histogram map and compression 220 of histogram count are independently performed from each other. In an implementation form, only compression 210 of histogram map is performed but not compression 220 of histogram count.

Figure 9:
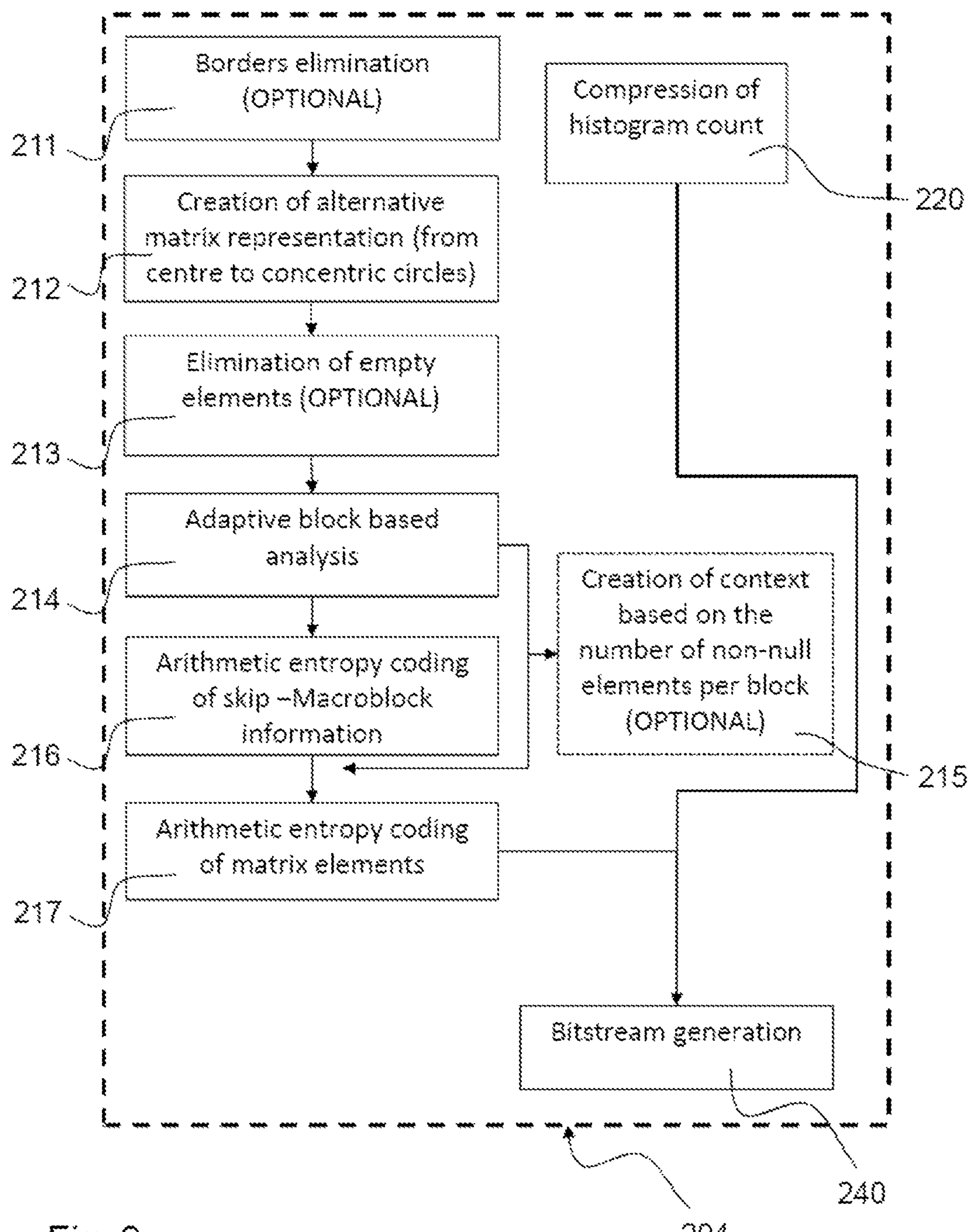
FIG. 9 shows a schematic diagram of a location information compression method according to an implementation form.

In an implementation form, the generation 200 of histogram map and histogram count corresponds to determining 101 the set of local features from an image and describing 103 each key point by a descriptor and the compression 210 of histogram map corresponds and to the creation of a matrix representation of the key points due to the scanning 105 and the following 211-212-213-214-215-216-217 operations (see FIG. 9).

Aspects of the disclosure present a new method for compression of the location information of descriptors (local features) extracted from an image, in particular for the compression of histogram map matrix as depicted in FIG. 2. The method provides improved compression when compared to the state of the art technology. The method can be applied without encountering any native problem at full resolution level.

Aspects of the disclosure are based on a new representation of the data, which enables a more efficient block-based analysis and representation. An adaptive block-based analysis can be applied on top of this new representation as will be described below with respect to FIGS. 7, 8 and 9 for better exploiting the nature of the data to achieve improved compression rates.

The complexity of this method is extremely limited because no complex operations are encompassed. The most resource consuming operation is the context modelling, which is optional. Nevertheless, when context modelling is applied as will be described below with respect to FIG. 9, a new context modelling method is used which is simpler than the one adopted in the prior art. In an implementation form, the context modelling method relies on a very limited number of contexts. Furthermore, no extra bits are used for the context modelling, since macro-block information is intrinsically conveyed in the new data representation.

Implementation forms of the disclosure provide border elimination, i.e., elimination of fully empty areas at the matrix sides. Implementation forms of the disclosure provide a novel method for identification of null areas instead of the conventional identification of null rows and columns adopted by RM.

Figure 3:
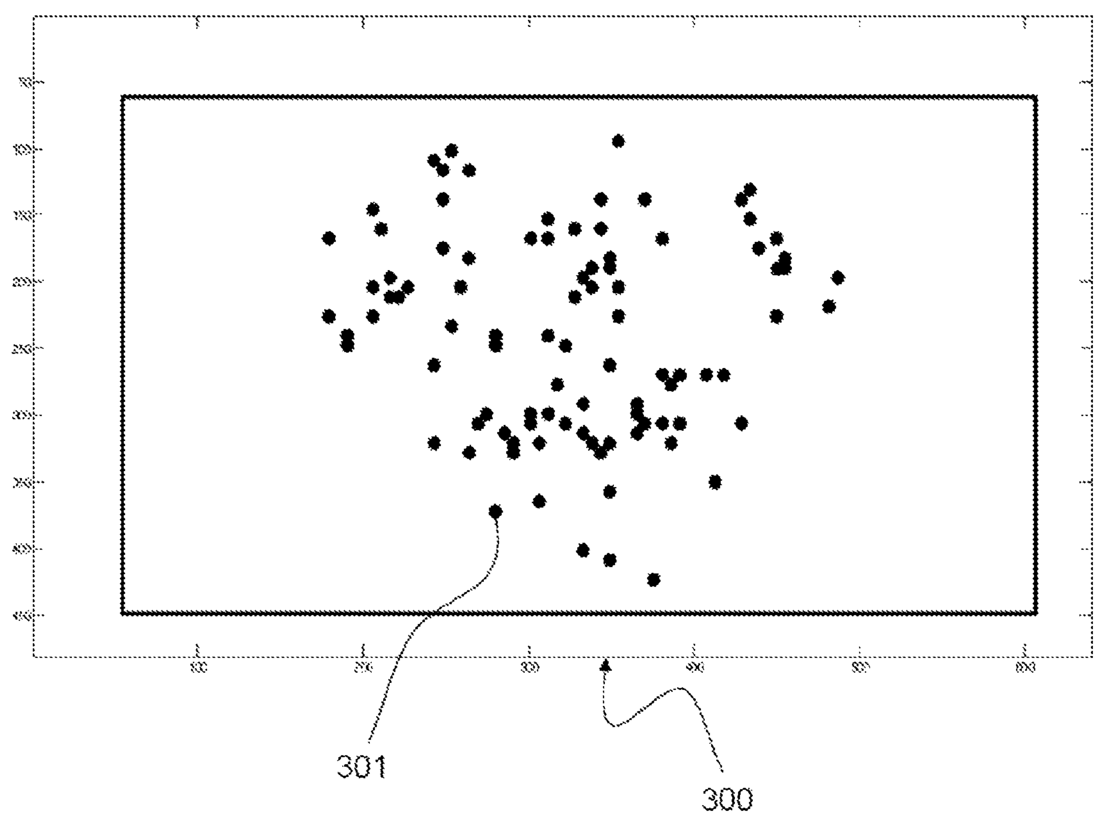
FIG. 3 shows a graph illustrating key point distribution in an image.

FIG. 3 shows a graph illustrating distribution of key points 301 in an image 300. As will be described below, the task of compression of histogram maps can be considered as a compression of a very sparse matrix. The basic idea of the disclosure is that, despite this sparsity, key points 301 are not uniformly distributed across the image, in particular at lower bitrates, as can be seen from FIG. 3. This happens in particular when key points selection mechanism is applied to identify a subset of key points from all the extracted key points. Because the objects of interest tend to be depicted in the center of an image, the key point selection mechanism also privileges short distances from the image center. As a consequence, the center of the histogram map matrix will be more densely populated, whereas the sides of the matrix will have a predominant number of zeros. When alternative key point selection methods are applied, for example based on Region of interests (ROI), the distribution of the key point in the image is still not uniform. Therefore, implementation forms apply an adaptive usage of the skip-Macroblocks information utilized in the [Stanford1] approach (that conversely applies the block representation uniformly across the image) to exploit this feature. In the center of the matrix empty areas occur very rarely. Therefore, implementation forms of the disclosure adopt very large macro-blocks, using in this way fewer bits for the skip-Macroblock information signalling. At the sides of the matrix, smaller macro-blocks are applied to identify with more precision the empty areas.

Figure 4:
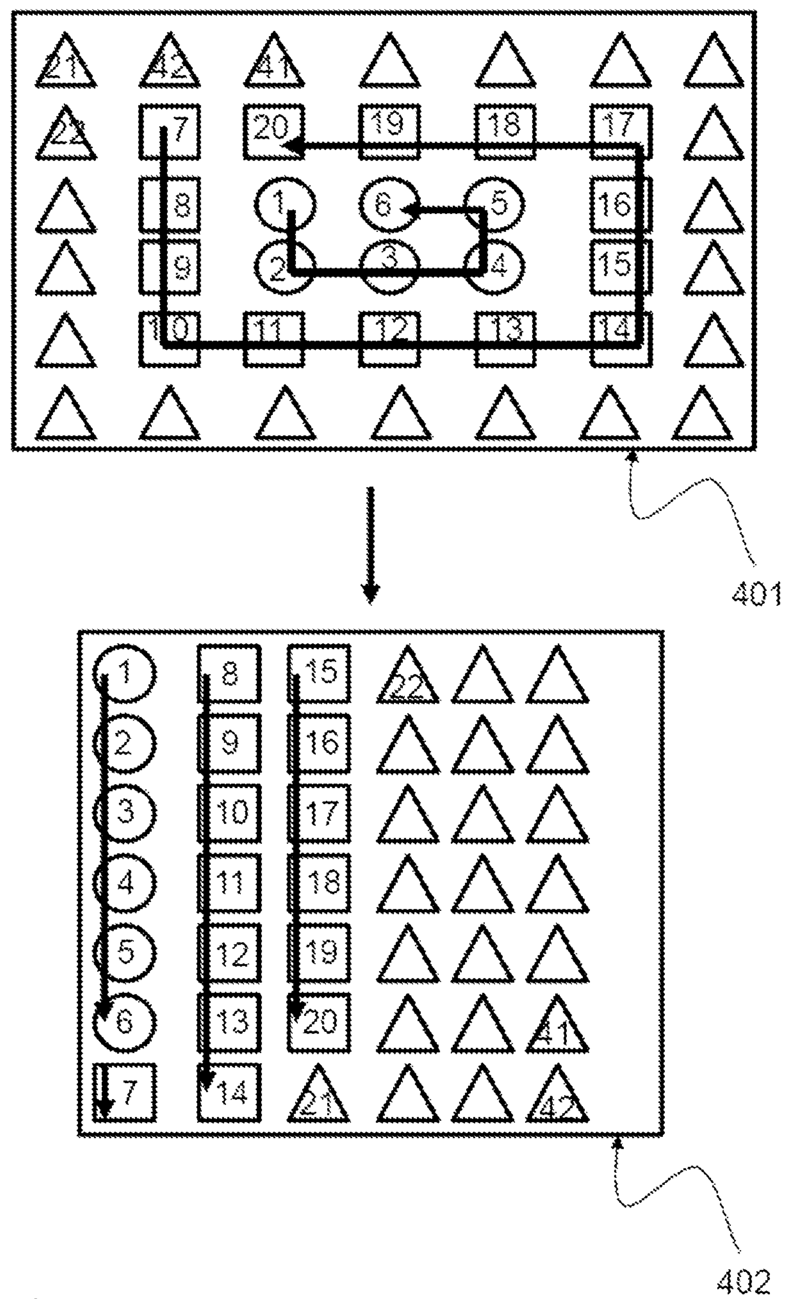
FIG. 4 shows a schematic diagram of the matrix scanning method for the creation of the new matrix representation.

FIG. 4 shows a schematic diagram of the scanning phase for the generation of the new matrix representation according to an implementation form. The diagram illustrates the scanning step 105 as described with respect to FIG. 1. The elements of the histogram map matrix are represented by elements 1, 2, 3, . . . , 42.

In an implementation form as depicted in FIG. 4, the image 401 is scanned beginning with elements 1, 2, 3, 4, 5, 6 (circles) located at a center of the image towards elements 21, 22, . . . , 41, 42 (triangles) located at a periphery of the image. The scanned elements are remapped into a matrix 402 representing the new matrix representation. In an implementation form as depicted in FIG. 4, the matrix elements are deposited column-wise in the matrix 402. By this scanning procedure, elements 1, 2, 3, 4, 5, 6 (circles) located at the center of the image 401 are stored on the left of the matrix 402, elements 7, 8, 9, . . . , 20 (squares) located in between center and periphery of the image 401 are stored in the middle of the matrix 402, and elements 21, 22, . . . , 41, 42 (triangles) located at the periphery of the image 401 are stored on the right of the matrix 402.

In an alternative implementation form of the scanning from center towards periphery not depicted in FIG. 4, the elements are deposited row-wise in the matrix 402. By this scanning procedure, elements 1, 2, 3, 4, 5, 6 (circles) located at the center of the image 401 are stored at the upper part of the matrix 402, elements 7, 8, 9, . . . , 20 (squares) located in between center and periphery of the image 401 are stored at the middle part of the matrix 402, and elements 21, 22, . . . , 41, 42 (triangles) located at the periphery of the image 401 are stored at the lower part of the matrix 402.

In an implementation form not depicted in FIG. 4, the image 401 is scanned beginning with elements 21, 22, . . . , 41, 42 (triangles) located at a periphery of the image towards elements 1, 2, 3, 4, 5, 6 (circles) located at a center of the image towards. The scanned elements are provided in a matrix 402 representing the new matrix representation. In an implementation form, the elements are deposited column-wise in the matrix 402. By this scanning procedure, elements 21, 22, . . . , 41, 42 (triangles) located at the periphery of the image 401 are stored on the left of the matrix 402, elements 7, 8, 9, . . . , 20 (squares) located in between center and periphery of the image 401 are stored in the middle of the matrix 402, and elements 1, 2, 3, 4, 5, 6 (circles) located at the center of the image 401 are stored on the right of the matrix 402.

In an alternative implementation form of the scanning from periphery towards center, the key points are deposited row-wise in the matrix 402. By this scanning procedure, elements 21, 22, . . . , 41, 42 (triangles) located at the periphery of the image 401 are stored at the upper part of the matrix 402, elements 7, 8, 9, . . . , 20 (squares) located in between center and periphery of the image 401 are stored at the middle part of the matrix 402, and elements 1, 2, 3, 4, 5, 6 (circles) located at the center of the image 401 are stored at the lower part of the matrix 402.

The matrix 402 provides a representation of the location information of the descriptors. Key points from the center of the image are mapped to one side, i.e. left, right, at the top or at the bottom of the another matrix representation. Therefore, relevant information of an image which is normally located at the center of the image is mapped to one side of the matrix. The matrix thus has a dense occupied part on one side and a sparse occupied part at the other side. This matrix structure or matrix format allows applying efficient compression techniques.

The new matrix format is fully reversible, and this adaptive block representation can be conveniently applied. In an implementation form, the new matrix representation is created as follows:

A size for macro-blocks is chosen (e.g., 128 as in the example of FIG. 5 and FIG. 6 described below).

Empty borders of the matrix are eliminated as an optional operation.

Starting from the center of the matrix, all the pixels are scanned through a counter-clockwise or clockwise scanning done on concentric circular rings and stored column-wise or rows-wise in the new matrix format as illustrated in FIG. 4.

In an implementation form, the pixels are scanned on concentric rectangles as depicted in FIG. 4. In an implementation form, the pixels are scanned on concentric circles, triangles, pentagons or other geometrical forms.

In an implementation form of the method described with respect to FIGS. 1 to 4, the scanning the image is performed counter-clockwise or clockwise. In an implementation form of the method described with respect to FIGS. 1 to 4, the scanning the image runs in sections of concentric circular rings of the image. In an implementation form of the method described with respect to FIGS. 1 to 4, the another matrix representation is provided column-wise or row-wise.

Figure 5:
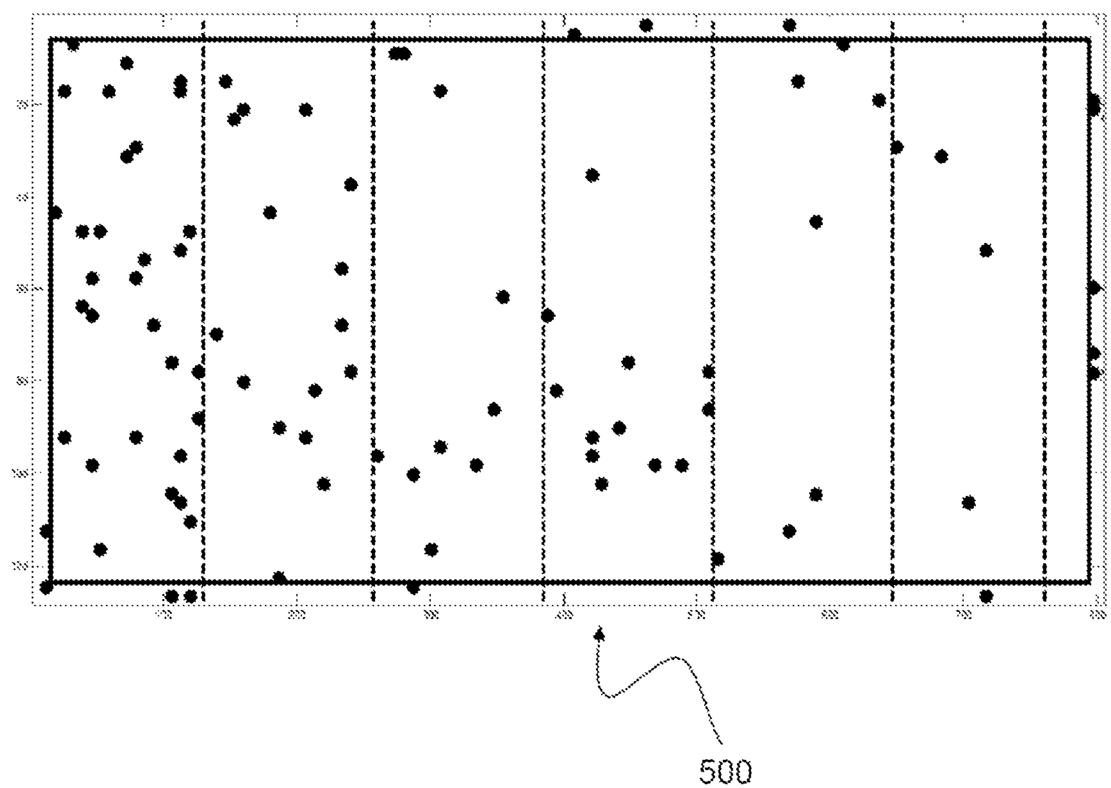
FIG. 5 shows a schematic diagram of the another matrix representation according to an implementation form.

FIG. 5 shows a schematic diagram of the another matrix representation 500 of a set of key points extracted from one image represented by a matrix according to an implementation form. As it is possible to see from the figure, the left side of the new matrix representation which is obtained according to the methods as described with respect to FIGS. 1 to 4, containing the central elements of the original matrix is much more densely populated than the right side.

Figure 6:
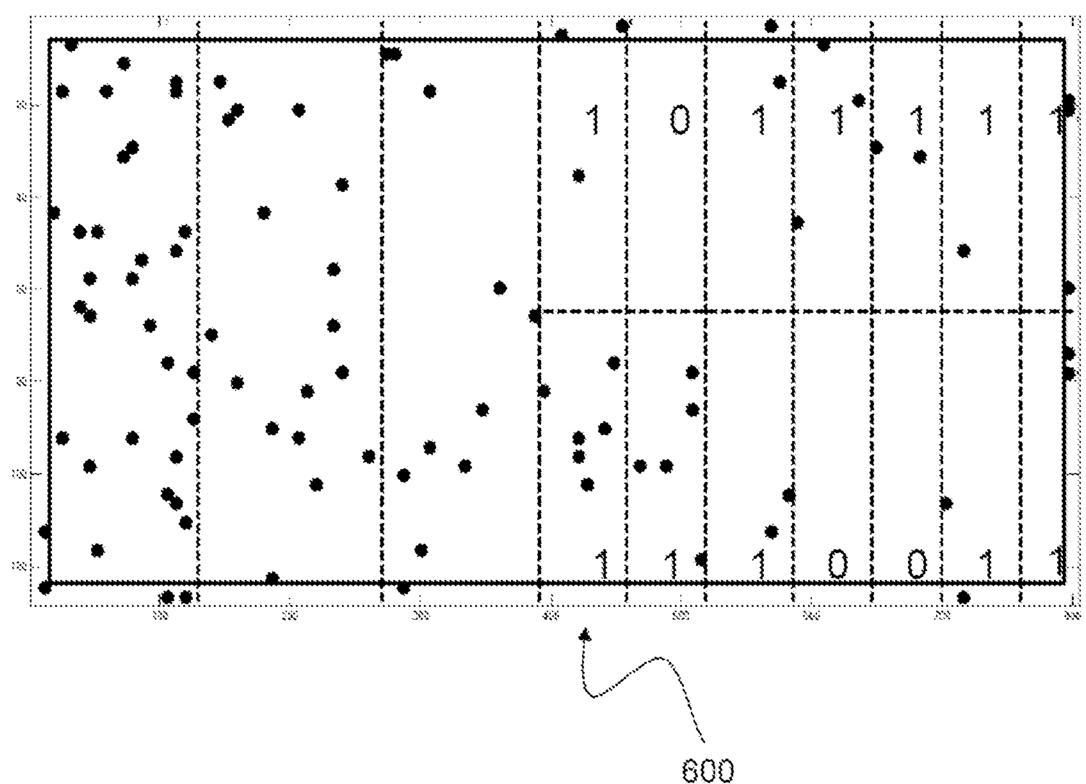
FIG. 6 shows a schematic diagram of an adaptive block-based analysis of the another matrix representation as depicted in FIG. 5 according to an implementation form.

FIG. 6 shows a schematic diagram of an adaptive block-based matrix analysis 600 of the another matrix representation 500 as depicted in FIG. 5 according to an implementation form.

Starting from this new matrix representation 500, an adaptive block-based analysis is applied. To the left side of the new matrix representation 500, macro-blocks of MB_Size dimension are applied, e.g., 128 pixel times 128 pixel according to the scale of the matrix representation 600. To the right side of the new matrix representation 500, macro-blocks of a fraction of MB_Size dimension (typically MB_Size/2) are applied, e.g., 64 pixel times 64 pixel according to the scale of the matrix representation 600. In this way, the probability to encounter empty macro-blocks, which can be excluded by the subsequent compression techniques applied to the block, increases. In an implementation form, the number of macro-blocks of MB_Size dimension is fixed across the images. In an alternative implementation form, the number of macro-blocks of MB_Size dimension is changing according to the number of columns or rows in the matrix. The 0/1 indication about skip-Macroblocks is then entropy coded.

Figure 7:
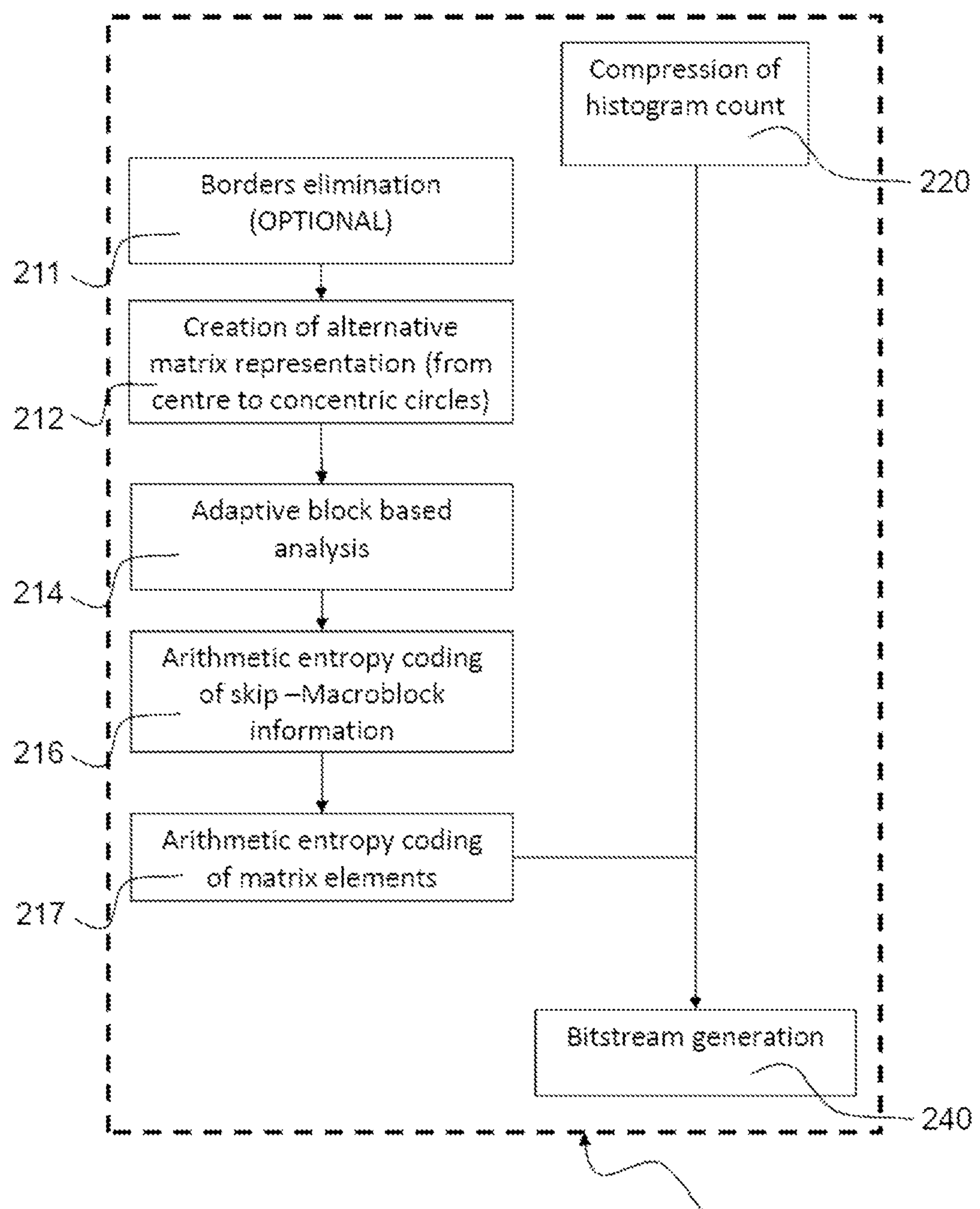
FIG. 7 shows a schematic diagram of a location information compression method according to an implementation form.

FIG. 7 shows a schematic diagram of a location information compression method 202 according to an implementation form denoted herein after as a first embodiment. The first embodiment adopts the sequence of operations as described with respect to FIGS. 1 to 6.

After the optional step of border elimination 211, the new matrix representation (denoted as alternative matrix representation) is generated 212, i.e., from center to concentric circles and the adaptive block analysis 214 according to the description with respect to FIG. 6 is applied. The results of this analysis, namely the information about skip-Macroblocks and the matrix elements of non-empty macro-blocks, are entropy coded in the subsequent steps 216 and 217. The compressed information is fused with compression of histogram count 220 to complete the location information compression phase. The bitstream generation 240 is performed with this compressed information.

In an implementation form, the borders elimination 211 comprises shrinking a size of the image by eliminating peripheral sections of the image in which no local features have been determined. The shrinking is performed before scanning the image, which corresponds to the creation 212 of the another matrix representation.

In an implementation form, the adaptive block based analysis 214 performs partitioning of the another matrix representation into macro-blocks of different size as described with respect to FIG. 6, wherein macro-blocks carrying key points located at or around the center of the image have a larger size than macro-blocks carrying key points located at the periphery of the image. In an implementation form, the matrix representation of the location information comprises a first number, e.g., a number of 3 according to the illustration of FIG. 6 or any other number, of macro-blocks of MB_Size dimension for providing the key points located at and around the center of the image and a second number, e.g. a number of 14 according to the illustration of FIG. 6 or any other number, of macro-blocks of a fraction, e.g. a fourth according to the illustration of FIG. 6 or any other fraction, of MB_Size dimension for providing the key points located at the periphery of the image. In an implementation form, the first number of macro-blocks of MB_Size size dimension is fixed across all images. In an alternative implementation form, the first number of macro-blocks of MB-Size size dimension depends on a size of the matrix representation of the compressed image, in particular on the number of columns or of rows of the matrix representation.

In an implementation form, a skip-Macroblock bit sequence is used to indicate empty macro-blocks of the matrix representation carrying no location information. According to FIG. 6, the skip-macro-block bit sequence {1, 0, 1, 1, 1, 1, 1, 1, 1, 1, 0, 0, 1, 1} indicates empty macro-blocks of the second number of macro-blocks of fractional MB_Size dimension, where a "1" indicates a non-empty macro-block and a "0" indicates an empty macro-block.

The decoder applies the reversed operations in the opposite order. In an implementation form, the decoder applies unpacking the matrix representation of location information of the set of key points of the sequentially running through elements of the matrix representation from key points located at a periphery of the image to key points located at a center of the image or vice versa, wherein each key point of the image is described by a descriptor. The descriptor includes the location information specifying a position of the key point in the image. The local features are computed from oriented patches surrounding the key points.

Figure 8:
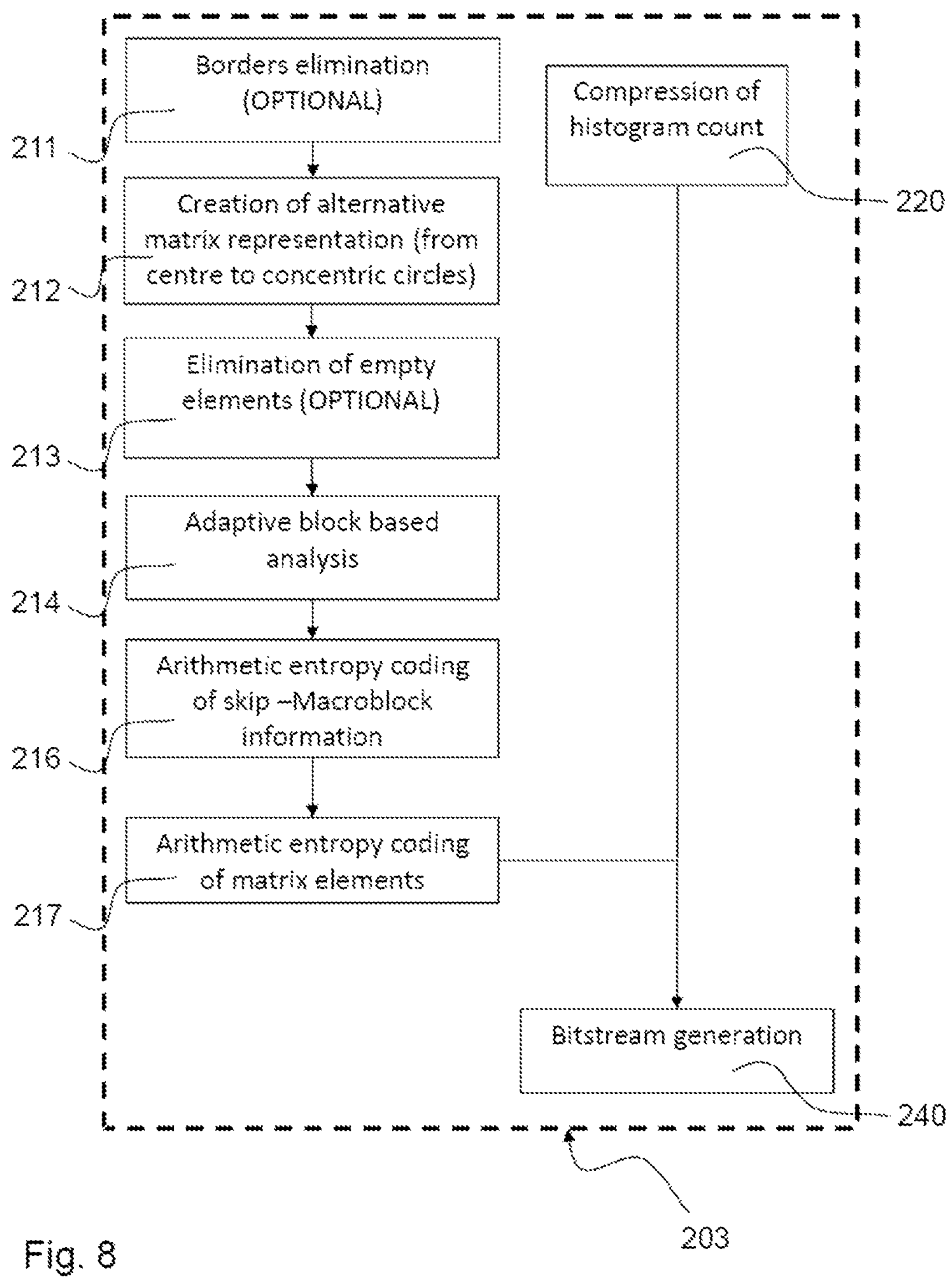
FIG. 8 shows a schematic diagram of a location information compression method according to an implementation form.

FIG. 8 shows a schematic diagram of a location information compression method 203 according to an implementation form denoted herein after as a second embodiment.

The image compression method 203 comprises the steps 211, 212, 214, 216, 217, 220 and 240 as described with respect to FIG. 7 and further comprises the optional step 213 of elimination of empty elements in between the steps 212 of creation of the another matrix representation and 214 of adaptive block based analysis.

After the step 212 of creation of the another matrix representation, a new method for the elimination of empty areas is applied. In contrast to the Reference Model solution as described above, where empty rows and columns are eliminated, the method described here is identifying the empty concentric rings during the new matrix representation construction. In the encoded bitstream, one bit for indicating whether the concentric rings are empty or not is used. The advantage of the approach presented here is that only one bit for each concentric ring (whose number is equal to the half of the lower matrix dimension) is used instead of one bit for each row and column in the image.

As can be seen from FIG. 8, in an additional elimination of empty elements step 213, the empty concentric rings elimination is performed as described above. In an implementation form, the step 213 of elimination of empty elements is eliminating empty elements of the matrix representation of the compressed image which empty elements correspond to concentric rings of the image carrying no local features according to the illustration of FIG. 3.

The decoder applies the reversed operations in the opposite order.

FIG. 9 shows a schematic diagram of a location information compression method 204 according to an implementation form denoted herein after as a third embodiment.

The image compression method 204 comprises the steps 211, 212, 213, 214, 216, 217, 220 and 240 as described with respect to FIG. 8 and further comprises the optional step 215 of creation of context based on the number of non-null elements per block after the step 214 of adaptive block based analysis. The results of the step 215 of creation of context are input to the step 217 of arithmetic entropy coding of matrix elements.

In the third embodiment, a context modelling is applied, privileging compression efficiency at the cost of a moderate complexity increase. Two different context models can be applied. In a first implementation form, context modelling is applied on the macro-blocks based on the average number of non-null cells in the training set corresponding to the macro-blocks at the same position in the new matrix representation. This approach has the advantage of not requiring extra-bits in the compressed bitstream because the position is known a-priori. In a second implementation form, context modelling is applied based on the number of elements in the currently analyzed macro-block. In this case, extra bits need to be spent in the compressed bitstream to signal the number of non-empty cells in each macro-block.

In an implementation form, the compressed matrix is provided by combining the entropy-coded skip-Macroblock bit sequence as described with respect to FIG. 7 and the entropy-coded location information of non-empty macro-blocks of the matrix representation of the compressed image, wherein the location information is entropy-coded by using a context model exploiting an average number of non-empty elements in the non-empty macro-blocks as illustrated in step 215 of FIG. 9.

The decoder applies the reversed operation in the opposite order.

Figure 10:
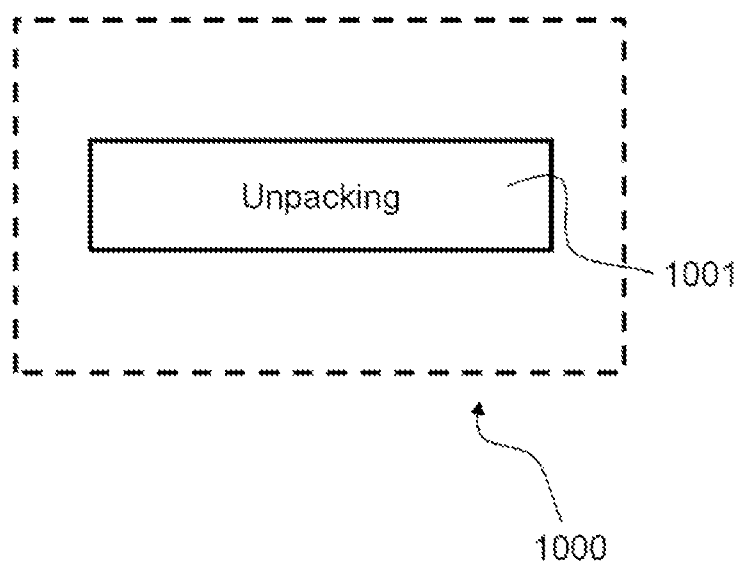
FIG. 10 shows a schematic diagram of a location information decompression method according to an implementation form.

FIG. 10 shows a schematic diagram of a method 1000 for reconstructing location information of an image from a matrix representation of location information of a set of key points of the image according to an implementation form.

The method 1000 includes unpacking 1001 the matrix representation of location information of the set of key points of the image according to a pre-determined order, wherein the local features of the image are computed from oriented patches surrounding the key points.

In an implementation form, the method 1000 further includes entropy decoding of skip-Macroblock bits. In an implementation form, the method 1000 further includes entropy decoding of the location information related to non-empty cells.

Figure 11:
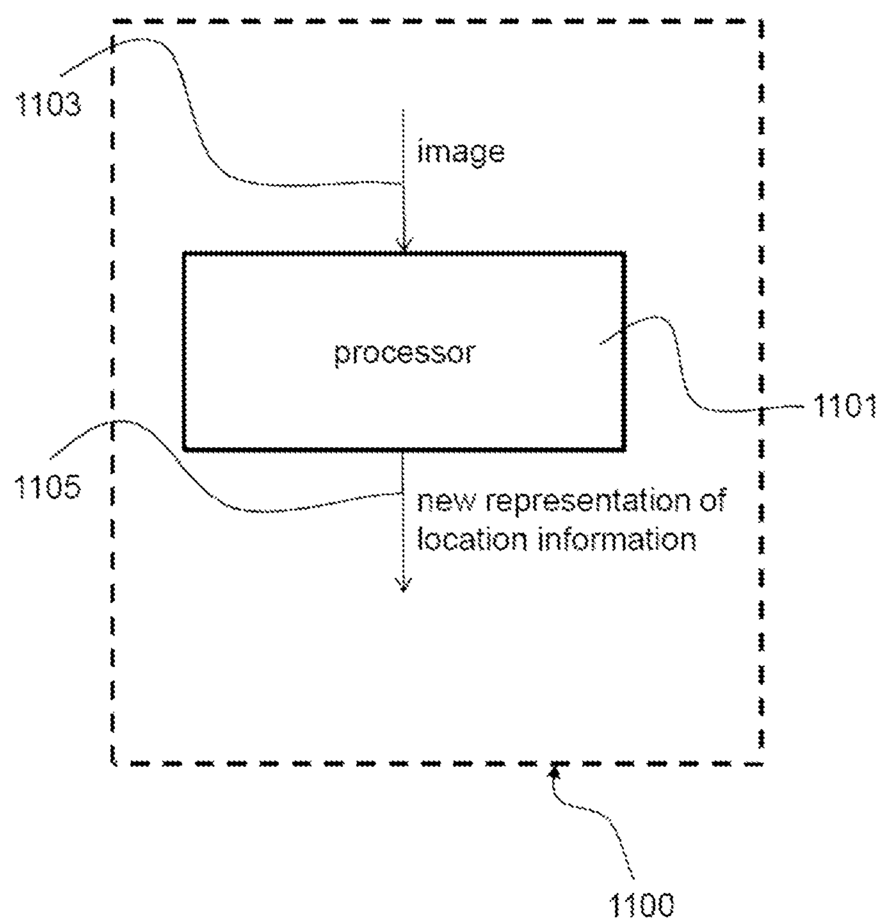
FIG. 11 shows a block diagram of a location information encoder according to an implementation form.

FIG. 11 shows a block diagram of a location information encoder 1100 according to an implementation form. The location information encoder 1100 comprises a processor 1101 which is configured for performing one of the methods as described with respect to the FIGS. 1 to 9, i.e., for providing a set of key points from the image, describing location information of the set of key points in form of a binary matrix, and scanning the binary matrix according to a pre-determined order, thereby creating a new representation of the location information of the set of key points. In an implementation form, the processor 1101 is configured to output the new representation of the location information of the set of key points in form of another binary matrix or in another adequate form.

In an implementation form, the location information encoder 1100 is further configured for scanning the histogram map matrix beginning with elements located at a center of the image towards elements located at a periphery of the image or vice versa to provide the new matrix representation and applying the following steps, namely adaptive-block analysis and entropy coding in order to obtain a compressed location information of the descriptors.

FIG. 11 shows the location information encoder 1100 receiving the image at its input 1103 and only providing the location information at its output 1105. However, different other information can be provided at its output 1105, for example, the descriptors, etc.

Figure 12:
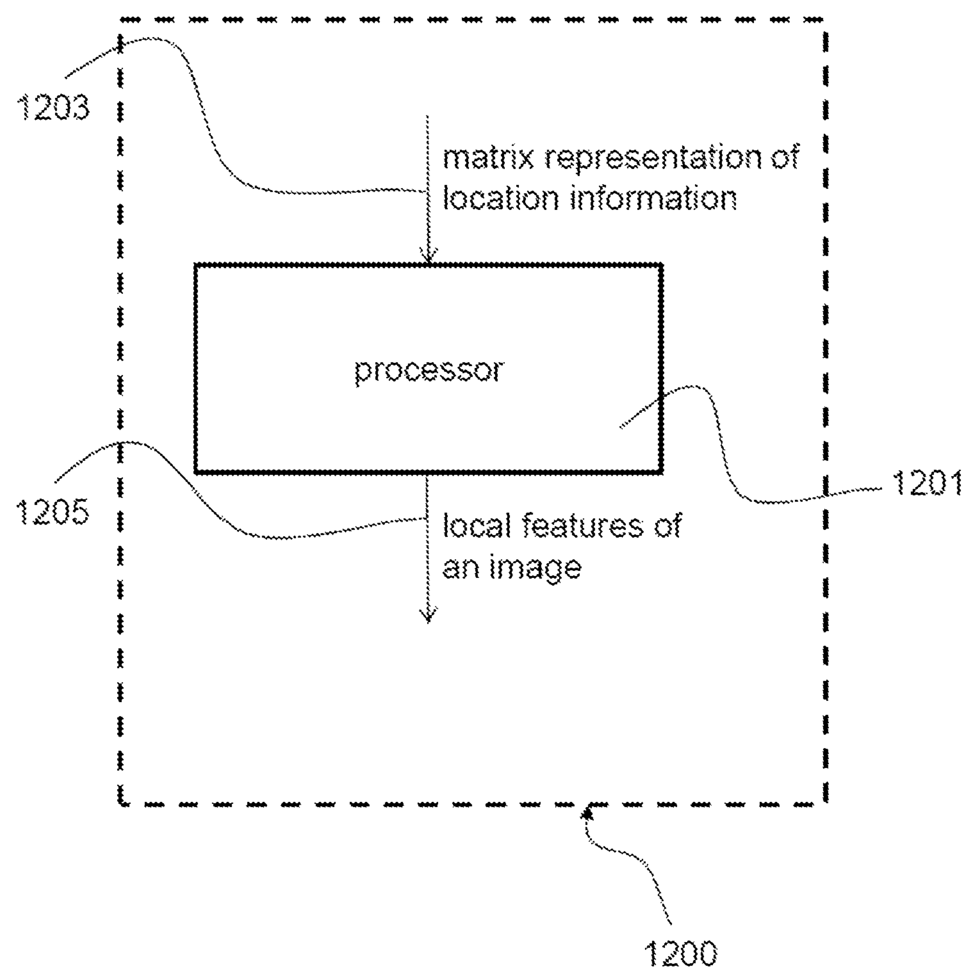
FIG. 12 shows a block diagram of a location information decoder according to an implementation form.
Figure 13:
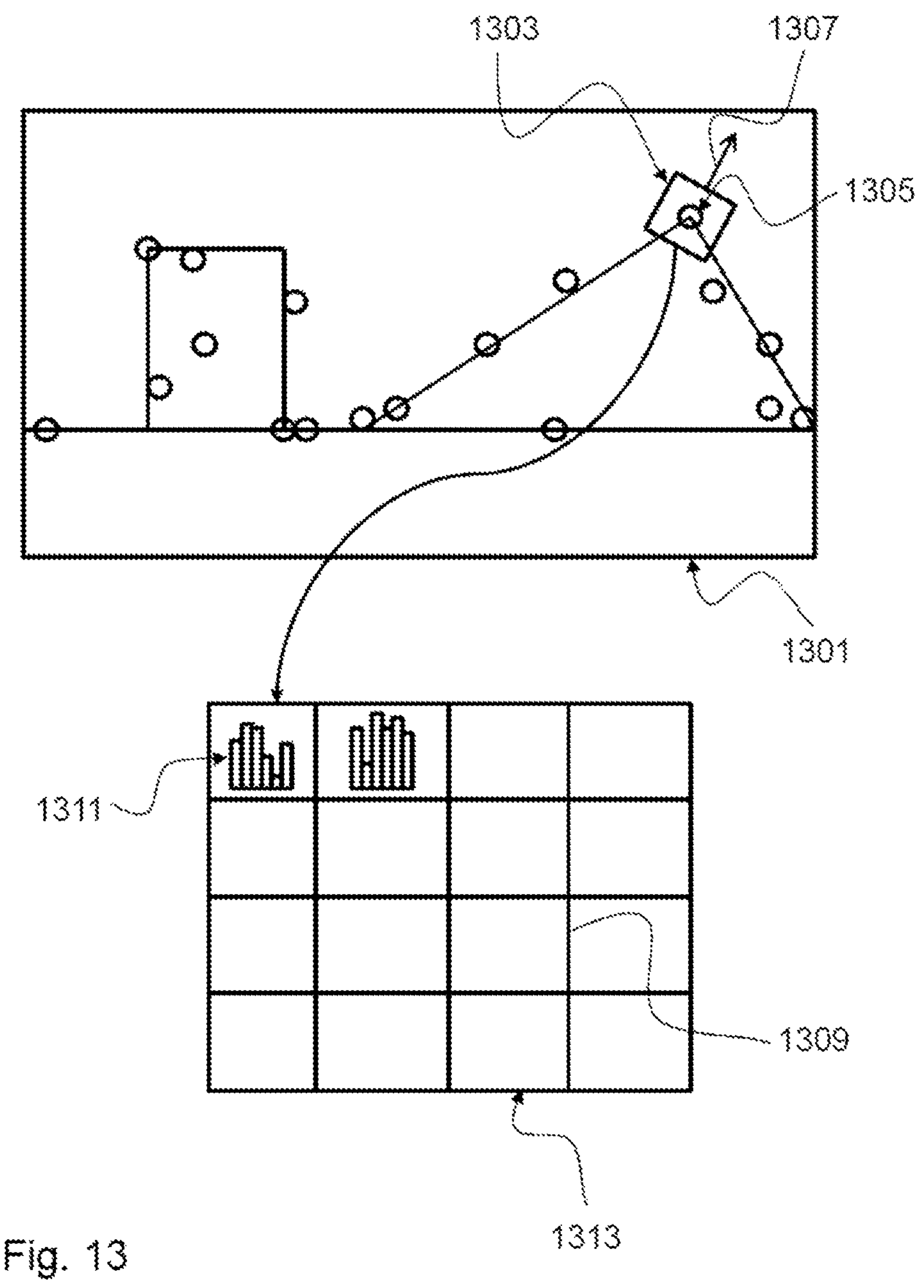
FIG. 13 shows an example of extraction and representation of local features for visual search.
Figure 14:
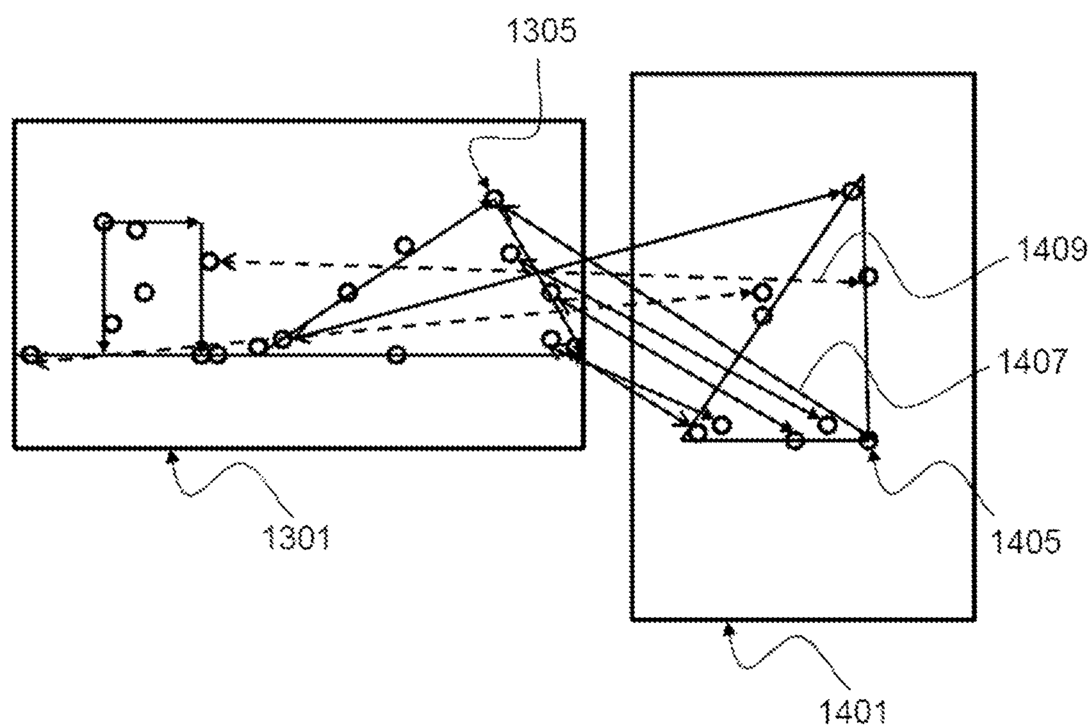
FIG. 14 shows an example of features matching and outlier elimination in a conventional comparison of two images.
Figure 15:
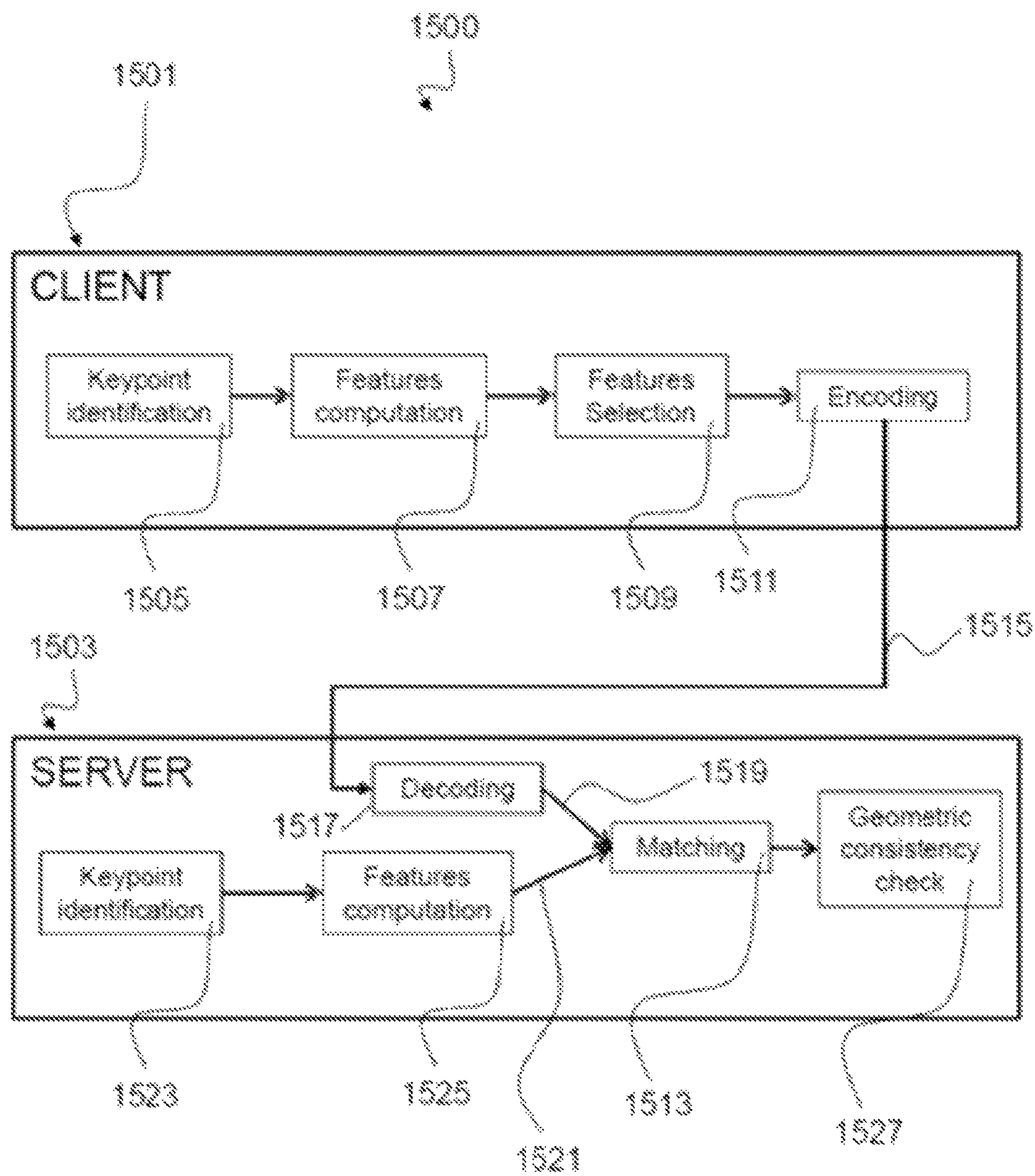
FIG. 15 shows a block diagram of the Visual Search pipeline adopted in typical client-server service architecture.

FIG. 12 shows a block diagram of a location information decoder 1200 according to an implementation form. The image decoder 1200 comprises a processor 1201 configured for performing the method as described with respect to FIG.

10, i.e., for reconstructing local features of an image from a matrix representation of location information of a set of key points of the image by unpacking the matrix representation of location information of the set of key points of the image according to a pre-determined order, wherein the local features of the image are computed from oriented patches surrounding the key points.

FIG. 12 shows the location information decoder 1200 only receiving the location information at its input 1203. However, different other information can be received at its input, for example, the descriptors, etc. FIG. 12 shows local features of an image leaving at its output 1205.

From the foregoing, it will be apparent to those skilled in the art that a variety of methods, systems, computer programs on recording media, and the like, are provided.

The present disclosure also supports a computer program product including computer executable code or computer executable instructions that, when executed, causes at least one computer to execute the performing and computing steps described herein.

The present disclosure also supports a system configured to execute the performing and computing steps described herein.

Many alternatives, modifications, and variations will be apparent to those skilled in the art in light of the above teachings. Of course, those skilled in the art readily recognize that there are numerous applications of the disclosure beyond those described herein. While the present disclosures has been described with reference to one or more particular embodiments, those skilled in the art recognize that many changes may be made thereto without departing from the scope of the present disclosure. It is therefore to be understood that within the scope of the appended claims and their equivalents, the disclosures may be practiced otherwise than as specifically described herein.

What is claimed is:

1. A method for processing an image, the method comprising:

providing a set of key points from the image;

describing location information of the set of key points in form of a binary matrix; and scanning the binary matrix beginning with key points located at or around a center of the image towards key points located at a periphery of the image or vice-versa, thereby creating a new representation of the location information of the set of key points, wherein the new representation of the location information of the set of key points is formed as another binary matrix, and wherein the another binary matrix is partitioned into macro-blocks of different size, wherein macro-blocks carrying location information of key points located at or around a region of interest of the image have a larger size than macro-blocks carrying location information of key points located at a periphery of the image.

2. The method of claim 1, wherein scanning the binary matrix is performed counter-clockwise or clockwise.

3. The method of claim 1, wherein scanning the binary matrix comprises scanning in sections of concentric circular rings.

4. The method of claim 1, wherein the another binary matrix is created column-wise or row-wise.

5. The method of claim 1, wherein for each key point of the set of key points a descriptor is computed from an oriented patch surrounding the key point.

6. The method of claim 1, wherein the binary matrix is a histogram map of empty and non-empty cells, a non-empty cell representing a position of a key point in the image.

7. The method of claim 1, further comprising compressing the new representation of the location information of the set of key points.

8. The method of claim 7, wherein the compressing the new representation of the location information of the set of key points comprises shrinking a size of the binary matrix by eliminating peripheral sections of the binary matrix carrying no location information, the shrinking being performed before scanning the binary matrix.

9. The method of claim 7, wherein the compressing the new representation of the location information of the set of key points comprises eliminating empty elements of the another binary matrix corresponding to concentric rings of the binary matrix carrying no non-empty values.

10. The method of claim 1, wherein entropy coding is applied to skip-Macroblocks information of the another binary matrix and to non-empty macro-blocks of the another binary matrix.

11. The method of claim 10, wherein context creation is applied when the entropy coding is applied.

12. A method for reconstructing local features of an image from a matrix representation of location information of a set of key points of the image comprising:

unpacking the matrix representation of location information of the set of key points of the image beginning with key points located at or around a center of the image towards key points located at a periphery of the image or vice-versa; and computing the local features of the image from oriented patches surrounding the key points;

wherein the matrix representation is created by the steps of:

providing a set of key points from the image;

describing location a on of the set key points in form a binary matrix; and scanning the binary matrix according to a pre-determined order, thereby creating a new representation of the location information of the set of key points, wherein the new representation of the location information of the set of key points is formed as another binary matrix, and wherein the another binary matrix is partitioned into macro-blocks of different size, wherein macro-blocks carrying location information of key points located at or around a region of interest of the image have a larger size than macro-blocks carrying location information of key points located at a periphery of the image.

13. A location information encoder, comprising:

a processor configured to:

provide a set of key points from an image;

describe location information of the set of key points in form of a binary matrix; and scan the binary matrix beginning with key points located at or around a center of the image towards key points located at a periphery of the image or vice-versa, thereby creating a new representation of the location information of the set of key point; and wherein the new representation of the location information of the set of key points is formed as a second binary matrix, and wherein the second binary matrix is partitioned into macro-blocks of different size, wherein macro-blocks carrying location information of key points located at or around a region of interest of the image have a larger size than macro-blocks carrying location information of key points located at a periphery of the image.

14. A location information decoder, comprising:

a processor configured to reconstruct local features of an image from a matrix representation of location information of a set of key points of the image by unpacking the matrix representation of location information of the set of key points of the image beginning with key points located at or around a center of the image towards key points located at a periphery of the image or vice-versa, wherein the local features of the image are computed from oriented patches surrounding the key points, and wherein the matrix representation is created by the steps of:

providing a set of key points from the image;

describing location information of the set of key points in form of a binary matrix; and scanning the binary matrix according to a pre-determined order, thereby creating new representation of the location information of the set of key points, wherein the new representation of the location information of the set of key points is formed as another binary matrix, and wherein the another binary matrix is partitioned into macro-blocks of different size, wherein macro-blocks carrying location information of key points located at or around a region of interest of the image have a larger size than macro-blocks carrying location information of key points located at a periphery of the image.

* * * * *